Figure 1:
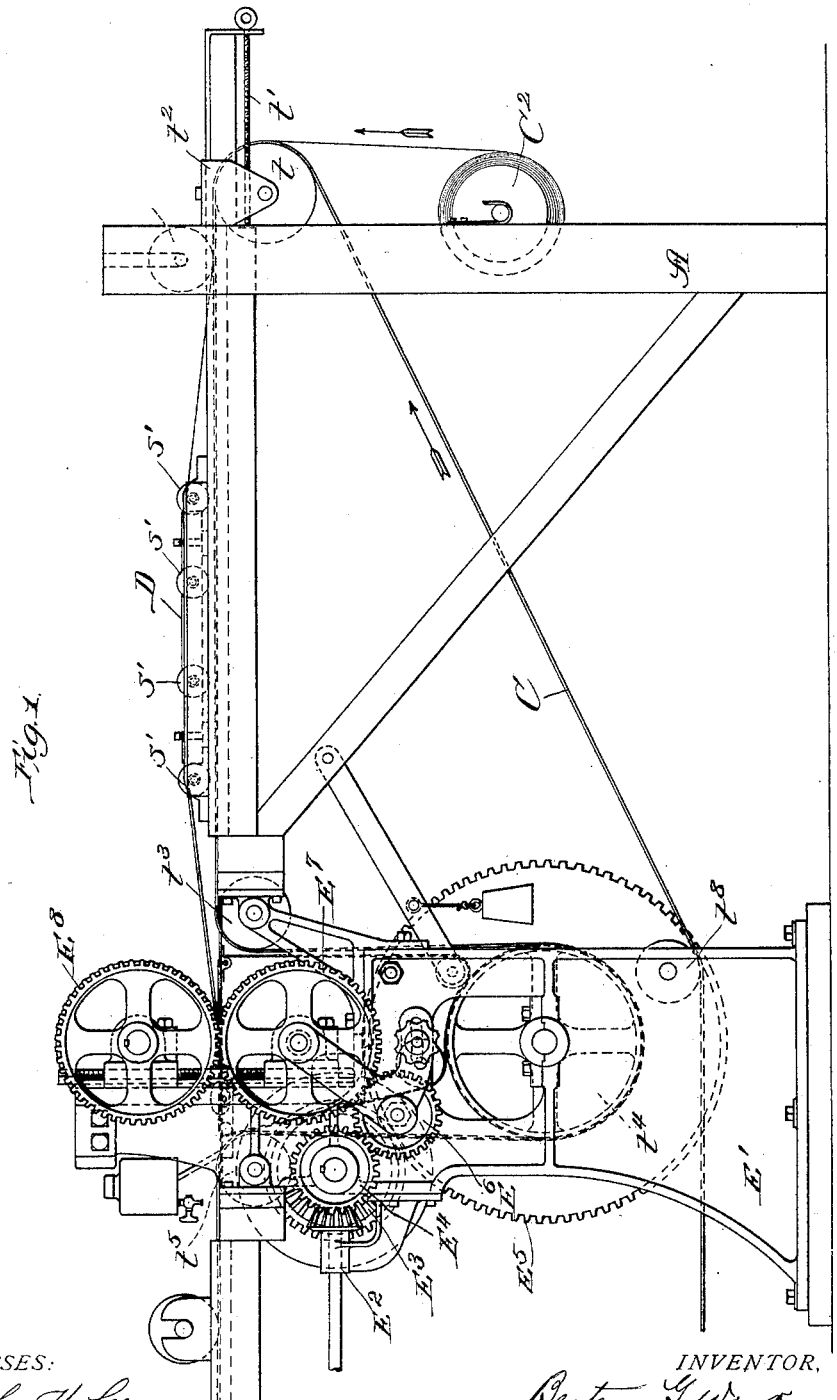

(No Model.) 8 Sheets—Sheet 1.

B. G. WORK.
MANUFACTURE OF RUBBER TUBING.

No. 595,088. Patented Dec. 7, 1897.

WITNESSES:
John H. Lee.
Richard P. Spencer.

INVENTOR,
Bertram G. Work
BY
Dyrenforth & Dyrenforth
ATTORNEYS.

(No Model.) 8 Sheets—Sheet 2.

B. G. WORK.
MANUFACTURE OF RUBBER TUBING.

No. 595,088. Patented Dec. 7, 1897.

WITNESSES:
John H. Lee.
Richard P. Spencer

INVENTOR,
Bertram G. Work
BY
Davenport & Davenport
ATTORNEYS

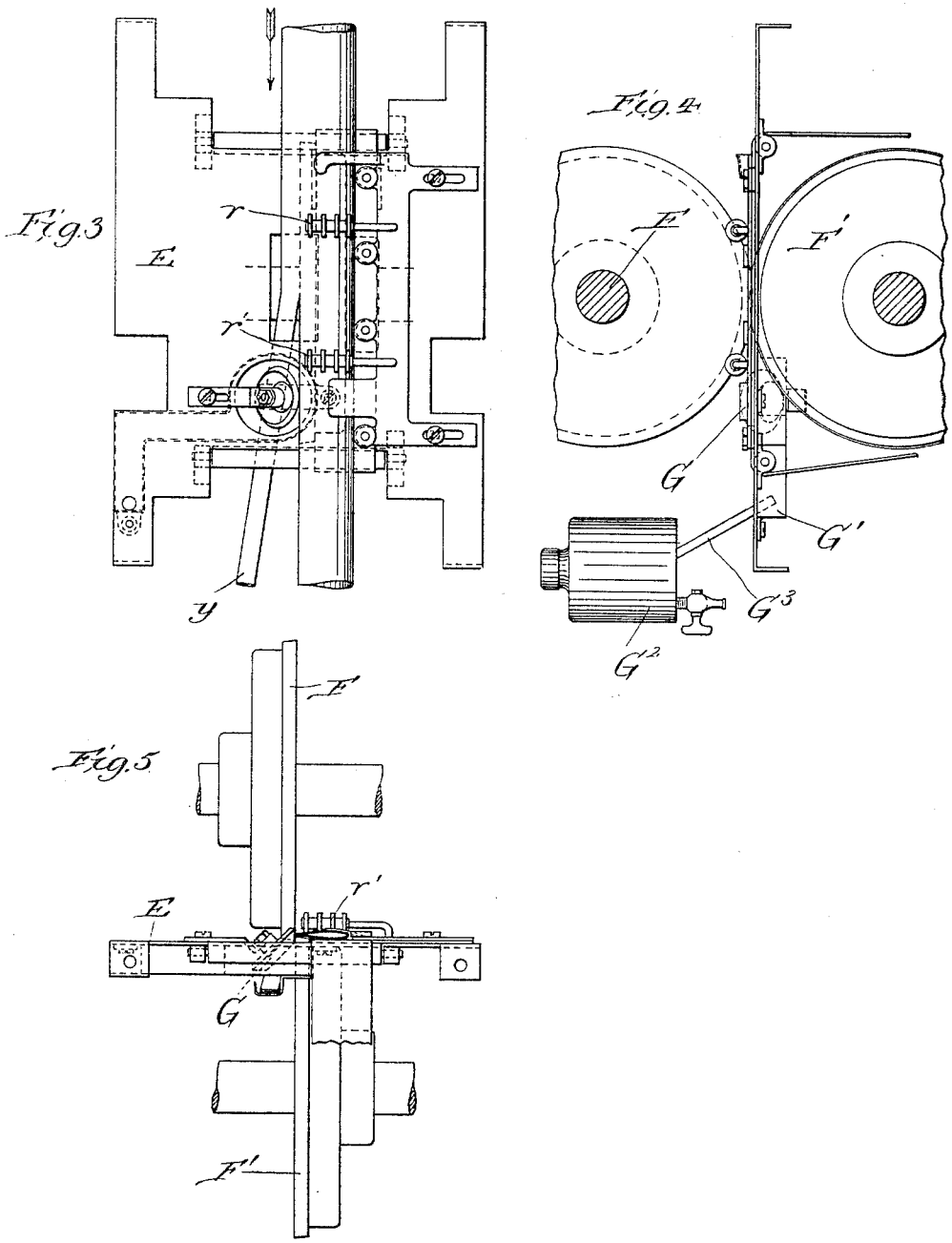

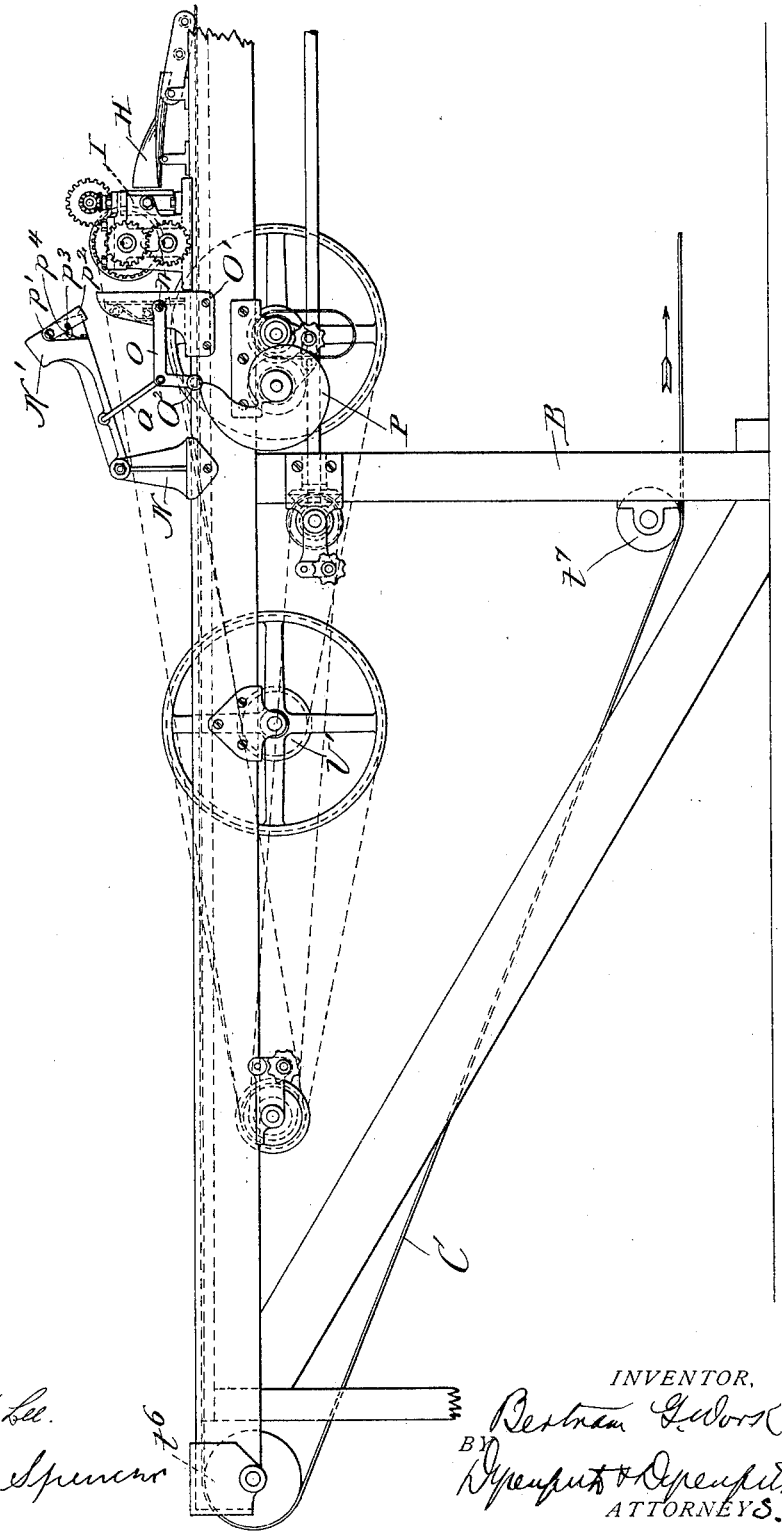

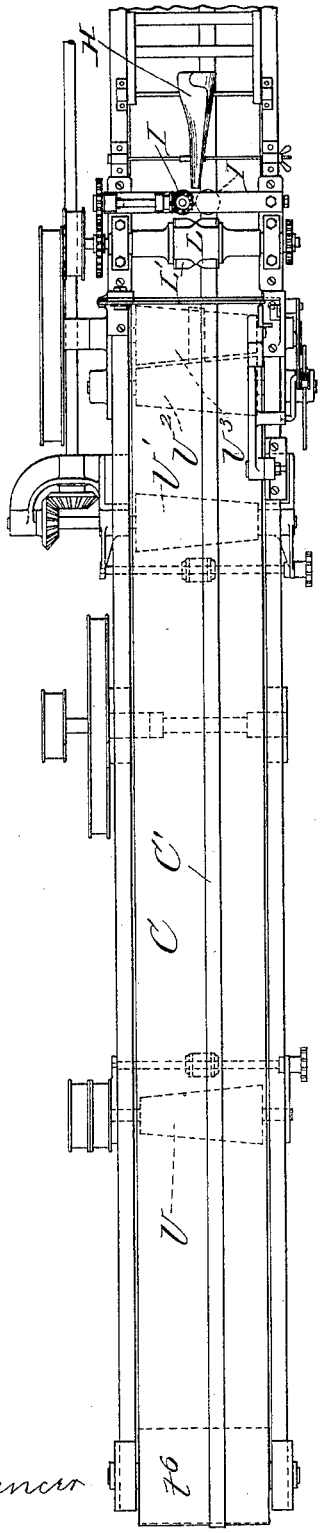

(No Model.) 8 Sheets—Sheet 6.
B. G. WORK.
MANUFACTURE OF RUBBER TUBING.
No. 595,088. Patented Dec. 7, 1897.
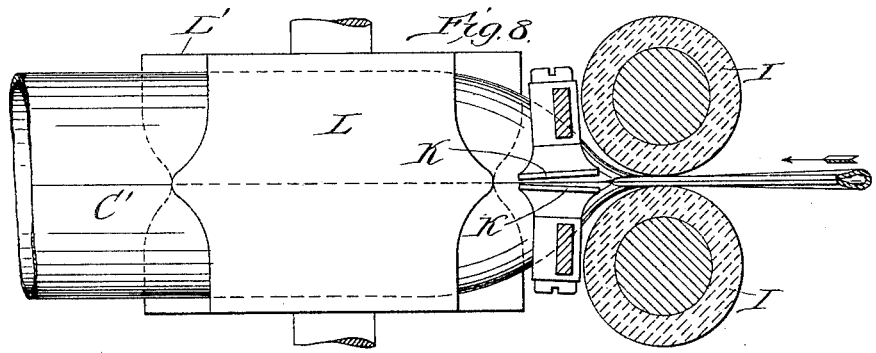
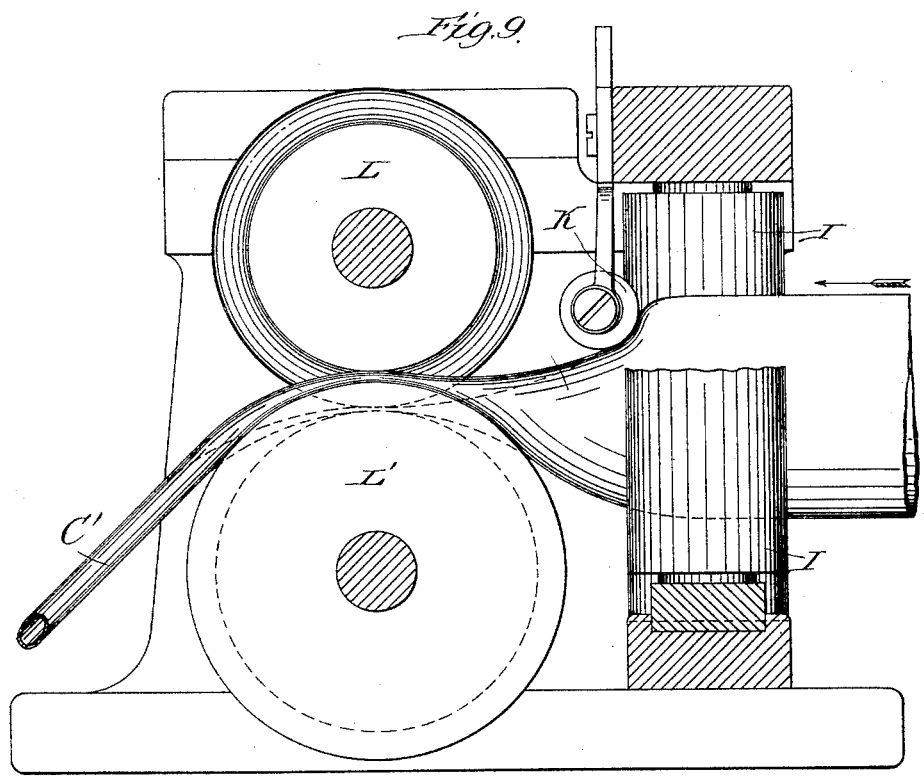

(No Model.) 8 Sheets—Sheet 7.
B. G. WORK.
MANUFACTURE OF RUBBER TUBING.
No. 595,088. Patented Dec. 7, 1897.
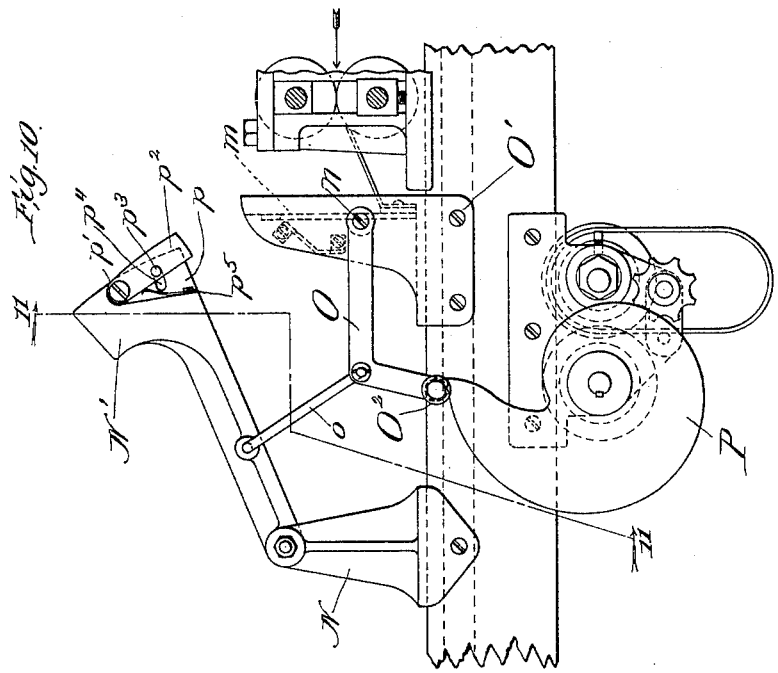
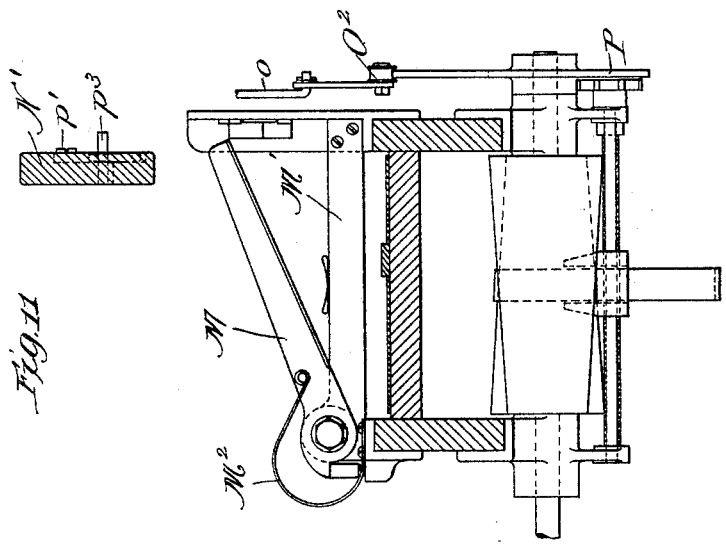
Witnesses.
John H. Lee.
Richard P. Spencer.
Inventor.
Bertram G. Work
By Dyrenforth & Dyrenforth
Attorneys.

(No Model.) 8 Sheets—Sheet 8.
B. G. WORK.
MANUFACTURE OF RUBBER TUBING.
No. 595,088. Patented Dec. 7, 1897.
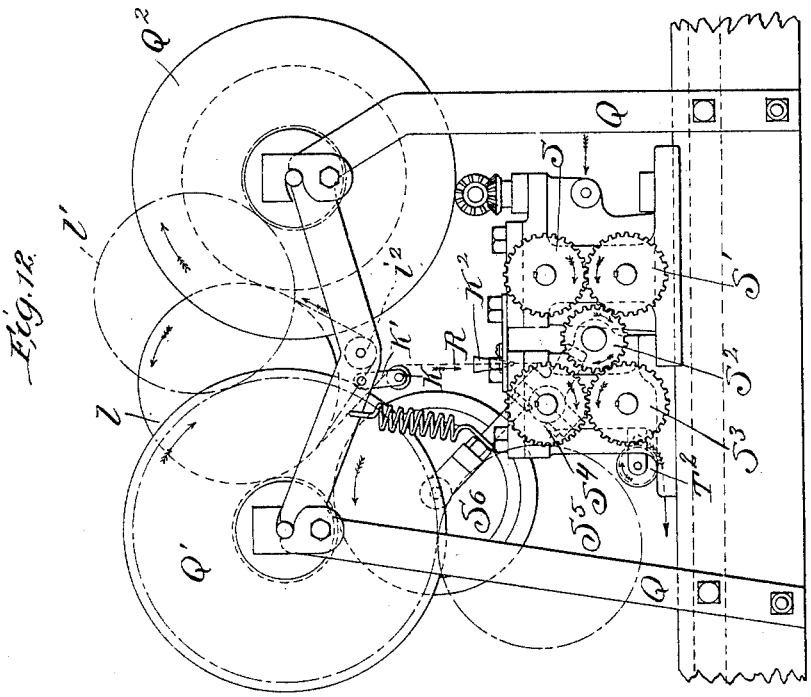
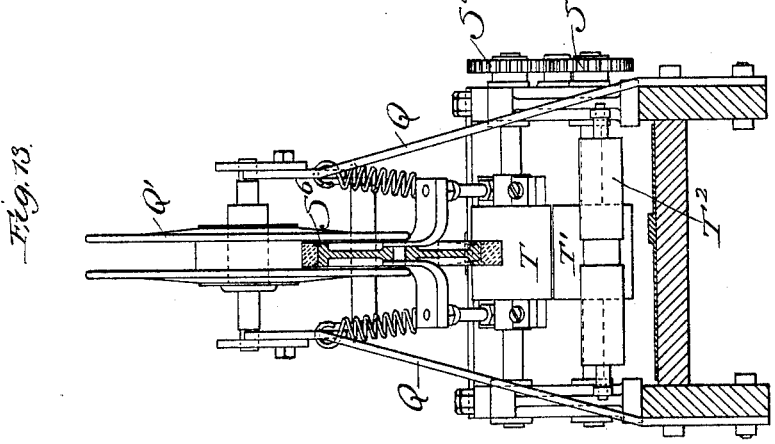
WITNESSES:
John H. Lee.
Richard P. Spencer
INVENTOR,
Bertram G. Work
BY
Dyrenforth & Dyrenforth
ATTORNEYS.

UNITED STATES PATENT OFFICE.

BERTRAM G. WORK, OF AKRON, OHIO, ASSIGNOR TO THE B. F. GOODRICH COMPANY, OF SAME PLACE.

MANUFACTURE OF RUBBER TUBING.

SPECIFICATION forming part of Letters Patent No. 595,088, dated December 7, 1897.

Application filed April 21, 1897. Serial No. 633,130. (No model.)

*To all whom it may concern:*

Be it known that I, BERTRAM G. WORK, a citizen of the United States, residing at Akron, in the county of Summit and State of Ohio, have invented a new and useful Improvement in the Manufacture of Rubber Tubing, of which the following is a specification.

My invention relates to the manufacture of rubber tubing, and more particularly to a machine contrived for the manufacture of tubing out of calendered sheets of rubber.

Rubber tubing for use in the arts, either as the inner tube of bicycle-tires, hose, or the like or for the various other uses to which rubber tubing as such is put, as well as for use in manufacturing elastic bands and other articles of an endless character and relatively short in their transverse length, has hitherto been made by a method employing a tubing-machine constructed with a die and plunger or other feeding device which serves to force out through an annular aperture a seamless tube of any desired length and thickness of material. Another method of manufacture has been to form a sheet usually by calendering, though not necessarily so, this sheet being cut into strips of double the width of the intended tube, and to bring the edges together and seal them, usually applying a reinforcing-strip over the meeting edges to give strength at this point. Doubtless other methods of manufacture have been practiced, but these two have been the most prominent. A well-recognized objection to tubing made on a machine employing a forcing-plunger and operating to produce a seamless tube in the first instance is that the wall of rubber is necessarily irregular in its texture, and this irregularity becomes more pronounced as the effect of vulcanization. For many uses to which rubber tubing is put, therefore, this method of manufacture is undesirable. The main objection that has heretofore presented itself to the rubber tubing produced from a calendered or other flat strip has been that the manufacture necessarily involves hand labor, which not only materially increases the cost, but, moreover, limits the output; and a further objection is found in the fact that even the utmost care which can be practiced in establishments employing the many employees engaged on this class of work will not prevent irregularity in the joint of the product. The edges being brought together by hand, abutted by hand, pressed together by hand, rolled down by hand, and covered by hand with the reinforcing-strip, many opportunities present themselves for the introduction of the results of almost imperceptible carelessness or inaccuracy, with the effect that the joint is irregular and the strength of the tube materially lessened. These objections have long been known in the art, but so far as I am aware no successful means of removing them have been contrived. Mechanical appliances have been suggested for supplanting hand labor in one or another of the various operations of manufacturing tubing, but so far as I am aware none of these have served to remove to a material and desirable extent the objections heretofore presented and now existing.

The object of my invention is primarily to produce rubber tubing from sheets by the employment throughout the operation of power-driven machinery.

A further and subsidiary—or, as it may be called, an "incidental"—object of my invention is to produce a tube which, notwithstanding that it is made from a sheet, the edges of which are caused to abut, shall to all practical purposes be seamless, this being effected by the method and means employed for producing the joint in the unvulcanized rubber, whereby at this point a strength in the rubber product will be found substantially equal to that found in any other part of the product.

A further incidental object is to produce rubber tubing absolutely uniform throughout—that is to say, exactly the same in cross-section at any one point as it is in all others.

Finally, a further object of my invention is to produce means for the manufacture of rubber tubing more economically, both in the matter of the actual cost and in the matter of the saving in waste material, than has been possible by any method heretofore practiced.

To these ends my invention consists in the method and apparatus hereinafter described, and pointed out in the claims.

In the drawings, in which because of the size of the apparatus and with a view to making clear the details of construction which enter therein I have illustrated the various sections of the apparatus on separate sheets and have not illustrated them as all assembled on a single sheet—

Figure 2:
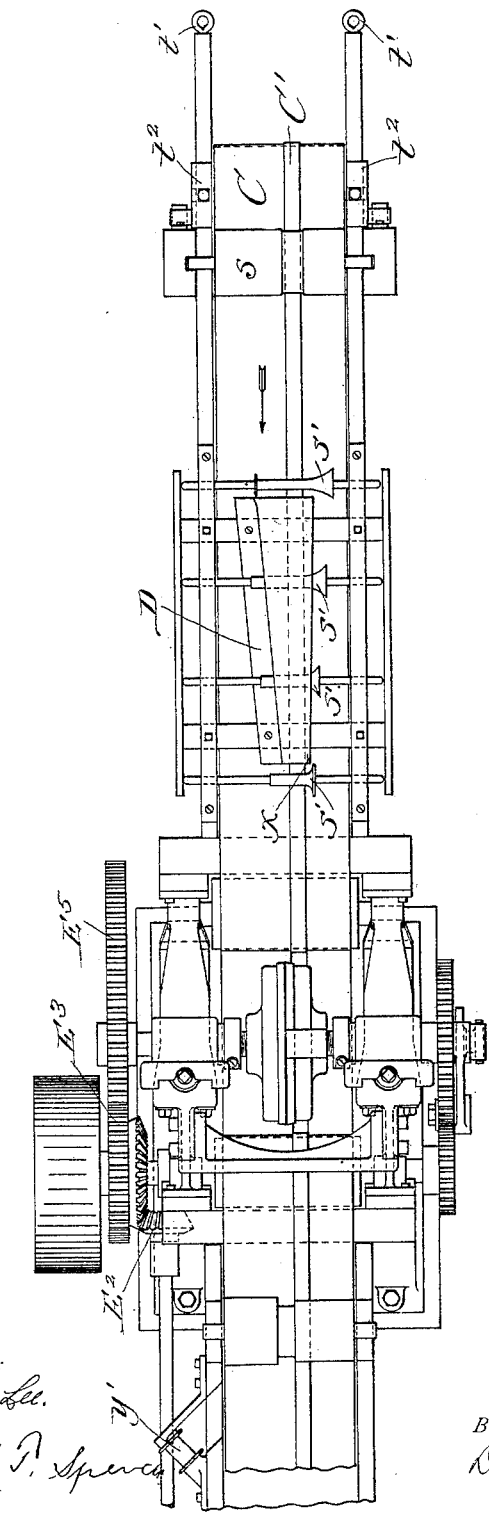

Figure 1 is a view in side elevation of the head end of the machine, or that at which the flat rubber strip is received and at which the strip is folded over into a tube shape ready for the formation of the joint. Fig. 2 is a plan view of the head end of the machine; Fig. 3, a plan view of the guide-plate and cementing apparatus which operates upon the folded strip before it leaves the head end; Fig. 4, a side elevation of said guide-plate and cementing apparatus; Fig. 5, an end view of the same; Fig. 6, a side elevation of the tail end of the machine, showing the mechanism for forming and perfecting the joint and for cutting the tube into sections; Fig. 7, a plan view of the same; Fig. 8, a plan view of the rollers which operate upon the partially-formed tube to complete the joint; Fig. 9, a view in side elevation of the same; Fig. 10, a view in side elevation of the shearing-off mechanism for separating the tube into sections; Fig. 11, a view in vertical cross-section taken on the irregular line 11 11 of Fig. 10 and viewed in the direction of the arrow; Fig. 12, a view in side elevation, and Fig. 13 a view in front sectional elevation, of the mechanism employed when required for applying to the tube a reinforcing-strip over the joint.

It may be explained that the head end and the tail end of the apparatus are separated by a distance sufficient to permit the solution upon the edges sufficiently to dry in the time required to pass from the head end to the tail end of the machine. This distance may be measured by the room afforded in the factory and may be twenty-five feet and may be more or less. It may also be stated, however, that all the machinery involved in the head end and in the tail end is driven from a common source of power, it being important, though of course not essential, that the operations of the two ends of the mechanisms shall be concurrent.

Extending from a frame or table A at the head end of the machine to a frame or table B at the tail end of the machine is an endless belt C, having the centrally-arranged endless strip or pad C' thereon. The belt C passes around the roller $t$ at the extreme end of the table A, which roller is made adjustable with relation to the frame or table by a screw $t'$, passing through the hanger $t^2$ and bearing against a stationary part of the table, as indicated in Fig. 1, and said belt C extends from the roller $t$ in a substantially horizontal plane to the roller $t^3$, thence downward around the roller $t^4$, thence upward over the roller $t^5$, and thence in a horizontal plane to the tail end of the machine, where it passes around the roller $t^6$ and downward around the roller $t^7$, thence back to the head end of the machine, where it passes around the roller $t^8$ and upward to the roller $t$. The function of the belt C is to carry the rubber led thereto from a stock-reel $C^2$ to the various operative parts of the mechanism for the formation of the rubber into a tube.

The rubber as received from the stock-roll $C^2$ is preferably in the form of a sheet or strip slightly wider than the intended width of rubber in the tube. This strip being led to the belt C and received between it and the pressure-roller $s$ is fed forward and received under the first of the series of four (more or less) folding-rollers $s'$. These folding-rollers $s'$ are at one end outwardly beveled and may be all the same length, although, for reasons presently appearing, they are made gradually shorter as they approach the guide-plate. Above the rollers $s'$ is mounted the folding-plate D, which is made of a sheet of tin or other suitable material folded upon itself in a wide fold and in such a manner that the folded edge shall gradually taper toward the fixed edge. At its widest part the folder is adapted to receive the full width of the strip, which strip in passing through the folder, with the coöperation of the rollers $s'$, is folded so that the edges are brought into substantially the same line at the side of the folder indicated by the letter $x$, Fig. 2. It should be stated that the strip of rubber before being conveyed to the belt C has one surface thereof covered with soapstone flour or other suitable agent, which will prevent the cohesion of the meeting surfaces. From the folder and from and over the last roller $s'$ the curved-over strip is led to the guide-plate E. The guide-plate E is upon a table E'. This table E' supports the driving-gear for the various moving parts connected with the head end of the apparatus. The parts of this driving-gear are lettered $E^2$, $E^3$, $E^4$, $E^5$, $E^6$, $E^7$, and $E^8$. $E^2$ indicates any suitable means transmitting to this mechanism the power from the primary source of power. The large gear $E^5$ carries the pulley $E^4$, which gives motion to the belt C. The gears $E^7$ and $E^8$ coöperate to drive the strip-shearing rollers F F', the function of which will presently appear.

The folded strip passes under the feeding-rollers $r$ $r'$, which serve to guide it in a straight line to and away from the coöperating circular shears F F', which serve to cut from the meeting edges of the folded strip a strip $y$, which is in turn led to the roller $y'$, Fig. 2, and thus away from the machine. The effect of the shear cut is not merely to form a square edge on both members, which constitu e the joint of the tube, but to bring the extreme inner corners of the edges into close contact under heavy pressure, with the result that the tube is entirely closed by this contact of the extreme inner corners of the edges. The folded strip being fed onward passes the rotating brush G, which is driven by a gear connection in any suitable manner with the chain of gear $E^2$ to $E^8$ and dips in its rotation in a solution-tank G', receiving solution through an automatic feed from the solution supply G² through the pipe G³. The edge of the brush G operates squarely upon the edges of the folded strip and applies to these edges a solution of rubber. This operation is more clearly illustrated in Fig. 5. The tube thus partly formed is now again received upon the belt C and carried to the tail end of the machine. The edge of the folded strip lies upon the central web or pad C' upon the belt C, and is thereby raised out of contact with the belt and given every opportunity to dry to the point necessary for the sufficient evaporation of the benzin which the solution contains.

At the tail end of the machine the tube, which is in an approximately flattened condition, enters the deflector H, which is in the form of a tube of an internal dimension throughout slightly in excess of the dimension of the folded strip which it receives and presents a gradual change in its exterior contour from the horizontally-presented opening at the admitting end to a vertically-presented opening at the other end. As the result of passing through the deflector H, the tube, which had before presented its meeting edges at one side, now presents its meeting edges on top. From the deflector H the tube passes between the vertical rollers I and thence under the diverging pressure-rollers K. These rollers K are each on a horizontal axis and are so arranged that at the point where they first receive the tube they are separated, while at the opposite point they are practically in contact with each other, as illustrated in Fig. 8. The effect of this arrangement of the rollers is to cause the edges of the rubber strip to be brought gradually toward each other, and in fact to come into intimate contact throughout the surface of the edge before the line of meeting is under the pressing action of the rollers. At the moment that the tube passes the rollers K the joint is completely formed; but in order that absolute firmness may be assured it is now passed between the rollers L L', the upper one of which, by preference, is centrally grooved, while the lower, L', has an annular tongue entering this groove, and the pressure afforded between the rollers thus presented serves firmly and finally to complete the formation of the joint between the edges of the tube. After the tube is thus formed it may at once be wound upon a reel or in any other suitable manner arranged for transportation or storage, or it may be cut off into lengths by hand. I prefer, however, to employ in connection with the apparatus the shearing-off arrangement which will automatically shear off the lengths of tube as the same passes out from under the rollers L L'. This shearing-off arrangement is illustrated in Figs. 6, 10, and 11.

Extending transversely across the bed of the carrier is a shear comprising the two spring-distended coacting blades M M', which under the operation of the mechanism presently shown has a scissors action. The tube is fed between the blades M M', which are distended by the spring M² during this time.

Supported upon one side of the frame upon the standard N is a hammer N', having at its outer end the recess $p$, swung on a pivot $p'$, in which is the nose $p^2$, having a pin $p^3$, which moves in the elongated slot $p^4$. Between the inner wall of the recess $p$ and the nose $p^2$ is a spring $p^5$. A link $o$ connects the hammer N' with a bent arm O, pivoted at $n$ in the vertical guide-standard O'. The free end of the arm O carries the roller O², which contacts with the cam P, driven through the medium of gear from the same source of power as all the rest of the apparatus. The inner face of the guide-standard O' affords a guide-surface which bears upon the swinging nose $p^2$ upon the hammer N' as the hammer descends, in the manner presently described, to cause the latter to be gradually forced inward. The movable member M of the shear passes through the slot $m$, extending transversely through the guide-standard O'.

The operation is as follows: At the moment when the cam releases the roller A² the hammer N' falls, the nose $p^2$ strikes against the movable blade M at a point near its extremity, and forces it downward, effecting, in conjunction with the stationary blade M', a rapid shear cut across the tube. As the hammer continues to fall the nose $p^2$ is driven so far into the recess $p$ that the movable blade M is free from contact with the nose $p^2$, and therefore, under the action of its own spring M², this member M is allowed quickly to rise to release the tube and permit its immediate farther advancement under the operation of the feeding-rollers, while the hammer N' rises more slowly under the lifting action of the cam P.

It is found that owing to the perfect parallelism in the edges of the folded strip, coupled with the perfect joint of the corners of these edges effected through the operation of the shear cutting-rollers F F' and the gradual but effective closing pressure obtained through the operation of the rollers K and L L', the joint in the tube is so perfectly made as in most instances to require no reinforcement. Indeed, it is found that with tubing of a certain thickness of material the strength at the joint is fully equal to that at any other part of the tube. For many purposes, however, and particularly where the tube is to be used as the inner tube of a pneumatic tire, it is deemed desirable to reinforce this joint with a strip of rubber, and this operation is accomplished during the movement of the tube through the machine by the apparatus illustrated in Figs. 12 and 13. It comprises a frame Q, which supports at one of its upper opposite corners a stock-reel Q', on which is wound a strip of rubber laid between strips of paper, linen, or other material which will prevent the adjacent folds from adhering one to the other, while the other upper corner of the frame receives the reel Q², the purpose of which is to receive the paper or other protective strip and withdraw it from the rubber. These reels are driven in unison by free disks *l l'*, the former of which bears upon the hub of the reel Q' and the paper on the reel Q², while the latter bears upon the stock on the reel Q' and the hub of the reel Q². Centrally upon the upper cross-piece of the frame Q is a guide-roller *l²*, which serves to guide the paper or other reinforcing-strip to the reel Q², and adjacent thereto and preferably supported upon the hanger *k'* is a guide-roller *k*, over which the rubber strip R is led downward to the guide-tube *k²*. The driving power for rotating the reels and feeding the strip and for operating the mechanism which applies the strip to the tube is found in the gears S, S', S², S³, S⁴, S⁵, and S⁶. Each of these gears S, S', S², S³, and S⁴ carries a roller, and the tube to which the strip is applied passes between the rollers on the gears S S', which, if preferred, may correspond with the rollers L L', and from between the rollers it passes under the roller on the gear S² and between rollers T T', driven, respectively, by the gears S⁴ S³. As the tube passes between the rollers T T' it receives the strip R, fed thereto through the guide-tube *k²*, and the rollers T T' serve to press the strip with great power upon the tube over the joint thereof, producing perfect and uniform adhesion of this strip at this point. The tube with the strip applied is then led under the roller T² and thus to the shearing-off mechanism, if the latter is used.

For the purpose of securing uniformity in movement between the head end and the tail end of the machine, which, being separated a long way from each other, are liable to vary in their speed, I employ in connection with the driving-belts which drive the tail end of the machine the cone-pulleys U, U', U², and U³, the pair U U' being connected by a belt and the pair U² U³ being connected by a belt. Of these the pair U U' are connected with and operate the tube-joint-forming mechanism, which can therefore have an increased or decreased speed of movement by simply shifting the belt transversely upon the oppositely-arranged cone-pulleys U U'. The cone-pulleys U² U³ are associated with the operation of the shearing-off mechanism, which may thus obviously be caused to be operated with greater or less speed by simply shifting the belt along these pulleys.

What I claim as new, and desire to secure by Letters Patent, is—

1. In the manufacture of rubber tubing from sheets, the means for forming the joint without increasing the thickness of the tube which comprises, in combination, means for folding the sheet, means for shearing the meeting edges and simultaneously pressing said edges together to cause their union at the extreme corner, means for deflecting the joined edges toward the median longitudinal line of the flattened tube, and means for exerting upon the tube at the joined edges pressure whereby the joint may be perfected, substantially as described.

2. In a machine for making rubber tubing from sheets cut into strips, the combination with a folder, of a shear-cutter, a deflector, whereby the meeting edges are brought toward a median line in the flattened tube, and pressers, whereby the meeting edges are brought together, substantially as described.

3. In a machine for making tubing from sheets cut into strips, the combination with the folder, of a shear-cutter operating to shear off the meeting edges and join the inner corners of said edges under pressure, a solution-applying device operating to solution said edges, and rollers operating upon the tube to force said edges together and perfect the joint, the parts being arranged as set forth, whereby the solution may be permitted to dry before said edges are pressed together, substantially as described.

4. In a machine for making tubing from rubber strips, the combination of folding, shearing and solutioning mechanisms, and joint forming and completing mechanisms, said mechanisms being driven simultaneously, and a carrier operating to convey the partially-formed tube from the first series of mechanisms to the latter series and serving to permit the solution to dry, substantially as described.

5. In a machine for making tubing from rubber strips, the combination with a carrier for the tube in process of manufacture, of tube forming, shearing and solutioning mechanisms at one end of the carrier, and joint forming and completing mechanisms at the other end of the carrier, all driven simultaneously, substantially as described.

6. In a machine for forming tubes from rubber strips, the combination with the carrier and means for folding the strip, of coacting shear cutting-disks F F', operating to cut a strip off both edges of the sheet to leave a tube of the intended dimension and at the same time to join together the opposite corners of said sheet, substantially as described.

7. In a machine for making tubes from rubber strips, the combination with means for advancing the strip and with means for folding it into tubular form, of rotary shear-cutters F F', and guide-rollers coöperating with the shear-cutters to guide the folded strips through and away from said shear-cutters, substantially as described.

8. In a machine for forming tubes from rubber strips, the combination with means for advancing the strip and for folding the same and of means for cutting the edge of the strip to produce a tube of the intended dimension, of a rotary solution-brush engaging the cut edges of the strip and guides for conveying said folded strip to and away from the solution-brush, substantially as described.

9. In a machine for forming tubes from rubber strips, the combination with the folding device for folding the strip into a tubular form, a cutting device for cutting off the edges of the strip, and a solutioning device for solutioning said edges, of a conveyer for conveying the folded and solutioned strip away from the solutioning device to permit the solution thereon to dry, substantially as described.

10. In a machine for forming tubes from rubber strips, the combination with a strip-folder, and edge-cutting means and a solutioning device, and with a carrier to convey the strip away from said solutioning device to permit the solution thereon to dry, of a deflector operating to twist the partially-formed tube to change the joint therein from the side toward a median line, and means for closing the joint, substantially as described.

11. In a machine for forming tubes from rubber strips, the combination with means for partially forming the tube into a folded strip with its edges adjusted and solutioned, and with means for deflecting the partially-formed tube whereby it shall become twisted to present the joined edges at the middle thereof, of converging rollers engaging the tube on opposite sides of the joint and operating to press the meeting edges of the joint together, substantially as described.

12. In a machine for making tubes from rubber strips, the combination with means for folding the strip, cutting off and adjusting the meeting edges and solutioning said edges, of a deflector operating to bring the meeting edges to the longitudinal center of the tube, converging rollers engaging the tube on both sides of said edges and operating to form the joint, and pressure-rollers operating to complete the joint by pressure thereon, substantially as described.

13. In a machine for making tubes from rubber strips, the combination with folding mechanism, edge-cutting mechanism and joint-forming mechanism, of means, substantially as described, for applying to the tube in the course of manufacture and after the formation of the joint of a reinforcing-strip, substantially as set forth.

14. In a machine for forming tubing from rubber sheets, the combination with the conveying-belt, of the folder D, shear-cutters F F', solutioner G, deflector H, vertical rollers I, converging rollers K, and compression-rollers L L', substantially as and for the purpose described.

15. In a machine for forming tubing from rubber sheets, the combination with the carrier C, of the strip-folding mechanism, shear-cutters F F' operating to shear the strip $y$ from the tube and to join the inner corners of the meeting edges of the tube, guides $r\ r'$, rotary solutioning-brush G, deflector H, converging rollers K and cam-actuated spring-controlled transversely-arranged shears M M', substantially as described.

16. In a machine for forming tubing from rubber strips, the means for completing the joint of the opposite edges, comprising the vertical rollers I, and converging rollers K, arranged to operate substantially as described.

17. In a machine for forming tubing from rubber strips, the means for severing off lengths of tubing, comprising, in combination, the transverse spring-controlled shearing-knives M M', the hammer N' operative to force the cutting-knives toward each other, and a rotary cam connected with and operating said hammer, substantially as described.

18. In a machine for forming rubber tubing, the means for cutting the tube into lengths, comprising the transverse coacting spring-controlled knives M M', the hammer N' having the swinging nose-piece $p^2$, the guide-standard O', the rotary cam P and a connection between the cam and the hammer for actuating the latter, the parts being arranged to operate substantially as described.

BERTRAM G. WORK.

In presence of—
P. W. LEAVITT,
W. A. MEANS.